(12) United States Patent
Wang

(10) Patent No.: US 8,350,164 B2
(45) Date of Patent: Jan. 8, 2013

(54) WEIGHING DEVICE FOR CAPSULES

(75) Inventor: Huyu Wang, Shanghai (CN)

(73) Assignee: Shanghai Hengyi Pharmaceutical Equipment Co., Ltd., Shanghai (CN)

( * ) Notice: Subject to any disclaimer, the term of this patent is extended or adjusted under 35 U.S.C. 154(b) by 39 days.

(21) Appl. No.: 12/987,242

(22) Filed: Jan. 10, 2011

(65) Prior Publication Data

US 2011/0108470 A1 May 12, 2011

Related U.S. Application Data

(63) Continuation of application No. PCT/CN2008/001839, filed on Nov. 3, 2008.

(30) Foreign Application Priority Data

Jul. 9, 2008 (CN) .......................... 2008 1 0040383
Jul. 9, 2008 (CN) .......................... 2008 1 0040385

(51) Int. Cl.
*G01G 13/02* (2006.01)
*B07C 5/16* (2006.01)

(52) U.S. Cl. ........ 177/116; 177/119; 209/592; 209/645; 53/502

(58) Field of Classification Search .................. 177/105, 177/108, 116, 119, 145; 209/592, 645; 52/502
See application file for complete search history.

(56) References Cited

U.S. PATENT DOCUMENTS

| | | | | |
|---|---|---|---|---|
| 4,223,751 A | * | 9/1980 | Ayers et al. ................ | 177/210 C |
| 4,811,802 A | * | 3/1989 | Yamamoto et al. ................ | 177/1 |
| 5,852,259 A | * | 12/1998 | Yanase .......................... | 177/145 |
| 6,114,636 A | * | 9/2000 | Cane' et al. .................... | 177/145 |
| 6,162,998 A | * | 12/2000 | Wurst et al. ................... | 177/145 |
| 6,327,835 B1 | | 12/2001 | Trebbi | |
| 6,407,346 B1 | * | 6/2002 | Baker ............................ | 177/83 |
| 6,478,162 B1 | * | 11/2002 | Yamamoto et al. ........... | 209/593 |
| 6,877,611 B2 | * | 4/2005 | Yamamoto et al. ........... | 209/646 |

FOREIGN PATENT DOCUMENTS

| | | |
|---|---|---|
| CN | 1200807 A | 12/1998 |
| CN | 1289243 A | 3/2001 |
| CN | 2700852 Y | 5/2005 |
| CN | 10120840 A | 7/2008 |
| DE | 19819395 C1 | 10/1999 |
| EP | 0685714 A1 * | 12/1995 |

OTHER PUBLICATIONS

Machine translation of EP 0685714 A1, Apr. 12, 2012.*

* cited by examiner

*Primary Examiner* — Randy W Gibson
(74) *Attorney, Agent, or Firm* — Manni Li; Mei & Mark LLP

(57) ABSTRACT

A weighing device for detecting the weight of capsules quickly including at least a hopper, an upper passageway including a discharge gate at the lower part thereof, a pushing structure, a transport wheel including a storage chamber, a discharging structure, a weighting platform, and a lower passageway. When the storage chamber of the transport wheel rotates to cooperate with the discharge gate, a capsule is pushed into the storage chamber by the pushing structure. When the storage chamber rotates to the lowest point of the transport wheel, the capsule in the storage chamber is pushed by the discharging structure and thus falls into the weighing platform disposed below the storage chamber. The weighting platform weighs the capsule and evaluates whether the capsule is up to standard. The device has high weighing efficiency.

13 Claims, 4 Drawing Sheets

WEIGHING DEVICE FOR CAPSULES

CROSS-REFERENCE TO RELATED APPLICATIONS

This application is a continuation of International Patent Application No. PCT/CN2008/001839 with an international filing date of Nov. 3, 2008, designating the United States, now pending, and further claims priority benefits to Chinese Patent Application No. 200810040383.X filed Jul. 9, 2008, and to Chinese Patent Application No. 200810040385.9 filed Jul. 9, 2008. The contents of all of the aforementioned applications, including any intervening amendments thereto, are incorporated herein by reference.

BACKGROUND OF THE INVENTION

1. Field of the Invention

The invention relates to a weighing device, and more particularly to a smart weighing device for detecting the weight of capsules quickly.

2. Description of the Related Art

Conventional automatic weighing and detecting machines for capsules include a feeding device, a discharging device, and a control circuit. At the lower part of the feeding device disposed is a weighing sensor. Capsules to be weighed slide into a weighing disk placed on the weighing sensor via a material transferring and loading groove of a fluted disc-typed material loading structure. The discharging device is composed of a qualified product collector and a disqualified product collector. The tail of the material loading structure is connected with a tilted discharging guide groove linking to the qualified product collector. Certain sections of the discharging guide groove are movable and the opening and closing thereof are controlled by an electromagnet controlled by an electric control circuit. At the lower end of the movable guide groove disposed is a reset mechanism. The disqualified product collector is disposed at the lower part of the opening of the movable guide groove. After processed by a signal processor, the output signal of the weighing sensor is transmitted to a host control computer via a standard communication port for controlling a stepping motor and the electromagnet. The machine can weigh capsules singly on the production line, with high speed, and automatically remove disqualified products, thereby improving the automation level of medicine weighing.

However, the above mentioned weighing machine has a low weighing efficiency. In addition, the machine is easily clogged during feeding, which affects the continuity of weighing.

SUMMARY OF THE INVENTION

In view of the above-described problems, it is one objective of the invention to provide a weighing device for detecting the weight of capsules in high efficiency and no clogging involved.

To achieve the above objectives, in accordance with one embodiment of the invention, there is provided a weighing device for detecting the weight of capsules quickly, the device comprising a hopper, an upper passageway, a pushing structure, a transport wheel, a discharging structure, a weighting platform, and a lower passageway; wherein the upper passageway is disposed vertically and the weighing platform is disposed below the transport wheel; a bottom opening of the hopper cooperates with a top opening of the upper passageway, capsules sliding down along the upper passageway one after another; at the lower end of the upper passageway disposed is a discharge gate, and at one side of the discharge gate disposed is the pushing structure capable of extending into the discharge gate, at the other side of the discharge gate disposed is the transport wheel comprising a storage chamber at the perimeter thereof; when the storage chamber of the transport wheel rotates to cooperate with the discharge gate, a capsule is pushed into the storage chamber by the pushing structure; when the storage chamber rotates to the lowest point of the transport wheel, the capsule in the storage chamber is pushed by the discharging structure and thus falls into the weighing platform disposed below the storage chamber; the weighing platform weighs the capsule and evaluates whether the capsule is qualified; when a next storage chamber rotates to above the weighing platform, the weighed capsule is pushed into the lower passageway; if qualified in weight, the capsule slide along the lower passageway into a qualified product chamber; otherwise, a valve of the lower passageway is opened so that the capsule slide into a disqualified product chamber.

In a class of this embodiment, a photoelectric detector is disposed on the upper passageway to detect the number of the capsules therein.

In a class of this embodiment, a tilted-upward blowing device is disposed above the photoelectric detector to blow away the capsules clogging the upper passageway.

In a class of this embodiment, two sides of the top end of the upper passageway are sloping.

In a class of this embodiment, the transport wheel is disposed on a main shaft driven by a motor, and furthermore, a first cam for driving the pushing structure and a second cam for driving the discharging structure are disposed on the main shaft.

In a class of this embodiment, the main shaft drives a plurality of transport wheels synchronously; each transport wheel cooperates with one upper passageway, pushing structure, weighing platform, discharging structure, and lower passageway; the pushing structures are driven by the first cam and a pushing shaft cooperating therewith; the discharging structures are driven by the second cam and a discharging shaft cooperating therewith.

In a class of this embodiment, prior to weighing, a standard weight of the capsules and a permissible deviation thereof are input into a PLC (programmable logic controller) using an input device. The PLC judges whether the products are qualified or disqualified.

BRIEF DESCRIPTION OF THE DRAWINGS

The invention is described hereinbelow with reference to accompanying drawings, in which.

DETAILED DESCRIPTION OF THE EMBODIMENTS

For further illustrating the invention, experiments detailing a weighing device for detecting the weight of capsules quickly are described below. It should be noted that the following examples are intended to describe and not to limit the invention.

Figure 1:
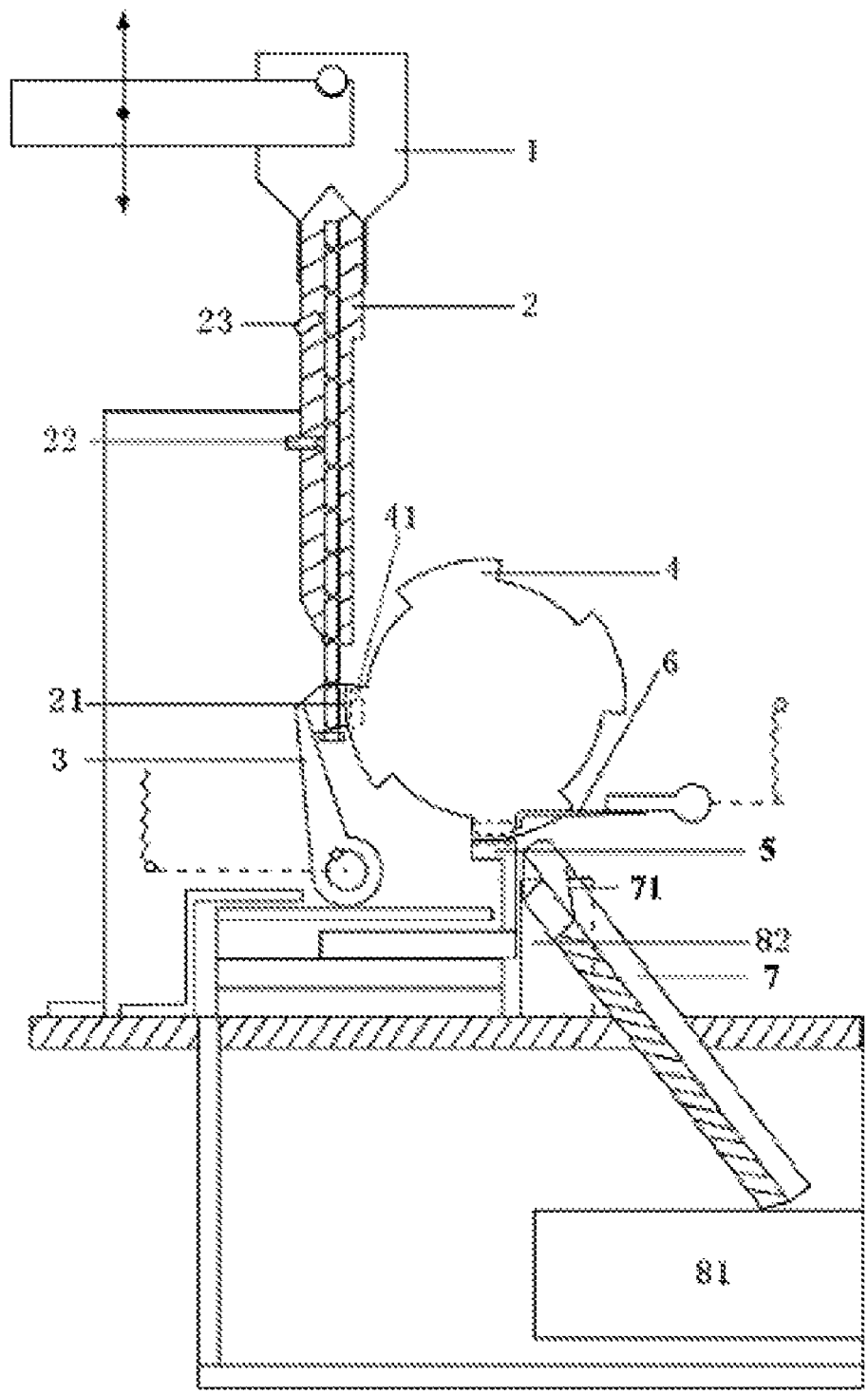
FIG. 1 is a schematic diagram of a weighing device for detecting the weight of capsules quickly according to one embodiment of the invention.
Figure 3:
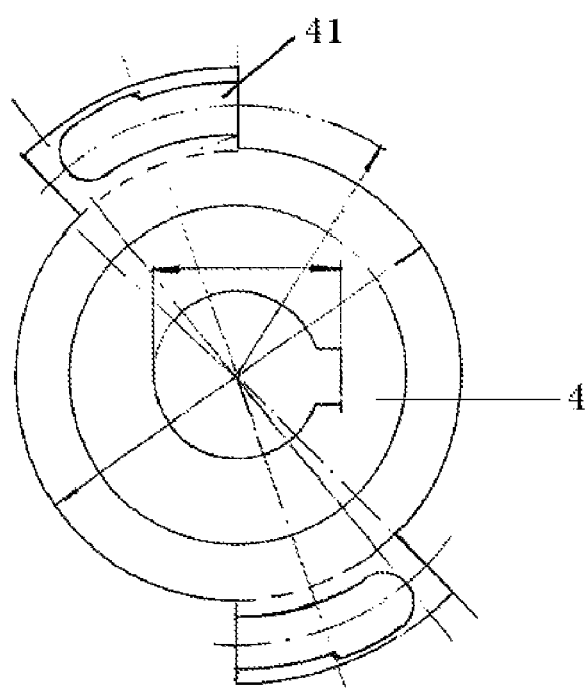
FIG. 3 is a schematic diagram of a transport wheel according to one embodiment of the invention.

As shown in FIGS. 1 and 3, a weighing device for detecting the weight of capsules quickly comprises a hopper 1, an upper passageway 2, a pushing structure 3, a transport wheel 4, a weighting platform 5, a discharging structure 6, and a lower passageway 7. The upper passageway 2 is disposed vertically and the weighing platform 5 is disposed below the transport wheel 4. A bottom opening of the hopper 1 cooperates with a top opening of the upper passageway 2, capsules sliding down along the upper passageway 2 one after another. At the lower end of the upper passageway 2 disposed is a discharge gate 21. At one side of the discharge gate 21 disposed is the pushing structure 3 capable of extending into the discharge gate 21, at the other side of the discharge gate 21 disposed is the transport wheel 4 comprising a storage chamber 41 at the perimeter thereof. When the storage chamber 41 of the transport wheel 4 rotates to cooperate with the discharge gate 21, a capsule is pushed into the storage chamber 41 by the pushing structure 3. When the storage chamber 41 rotates to the lowest point of the transport wheel 4, the capsule in the storage chamber 41 is pushed by the discharging structure 6 and thus falls into the weighing platform 5 disposed below the storage chamber 41. The weighing platform 5 weighs the capsule and evaluates whether the capsule is qualified. When a next storage chamber 41 rotates to above the weighing platform 5, the weighed capsule is pushed into the lower passageway 7. If qualified in weight, the capsule slide along the lower passageway 7 into a qualified product chamber 81; otherwise, a valve 71 of the lower passageway 7 is opened so that the capsule slide into a disqualified product chamber 82.

As shown in FIG. 3, the transport wheel 4 comprises two to four storage chambers 41 at the perimeter thereof, thereby improving the working efficiency.

The hopper 1 is driven by a motor and thus moves up and down. Consequently, the capsules therein fall into the upper passageway 2 one after another. A photoelectric detector 22 is disposed on the upper passageway 2 to detect the number of the capsules therein. When the number of the capsules reaches a preset value, the transport wheel 4 starts rotating. A tilted-upward blowing device 23 is disposed above the photoelectric detector 22. When the height of the accumulated capsules is less than a preset value, the blowing device 23 blows away the capsules clogging the upper passageway 2. Two sides of the top end of the upper passageway 2 are sloping, thereby benefiting the introduction of the capsules.

The photoelectric detector 22 and the blowing device 23 cooperate with each other to ensure the upper passageway 2 clear. The hopper 1 moves up and down and thus most capsules slide into the upper passageway 2 along the sloping top end. Occasionally, capsules clog the top opening of the upper passageway 2. If the problem isn't solved by the movement of the hopper 1, the height of the accumulated capsules will be lower than the position where the photoelectric detector 22 is disposed. Thus, the tilted-upward blowing device 23 disposed above the photoelectric detector 22 blows out high pressure air current. The high pressure air current blows away the capsules clogging the top opening of the upper passageway 2.

Figure 2:
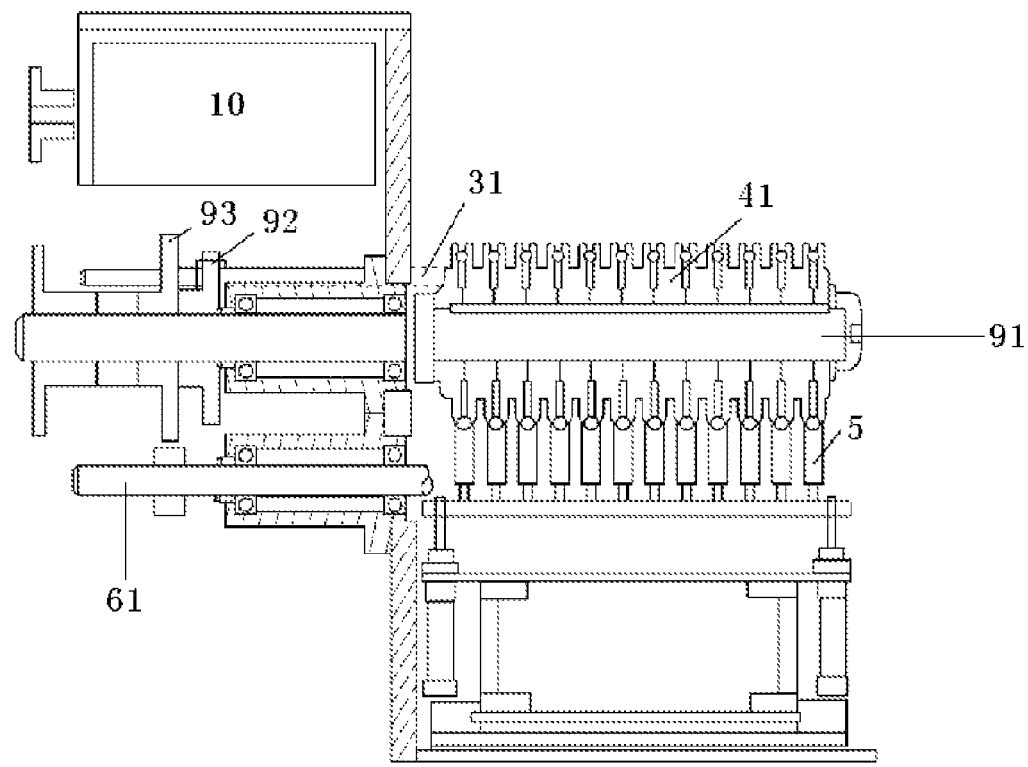
FIG. 2 is a schematic diagram of another weighing device for detecting the weight of capsules quickly according to one embodiment of the invention.

As shown in FIG. 2, the transport wheel 4 is disposed on a main shaft 91 driven by a motor 10. Also, a first cam 92 for driving the pushing structure 3 and a second cam 93 for driving the discharging structure 6 are disposed on the main shaft 91. The main shaft 91 drives a plurality of transport wheels 4 (there are 12 transport wheels in FIG. 2) synchronously. Each transport wheel 4 cooperates with one upper passageway 2, pushing structure 3, weighing platform 5, discharging structure 6, and lower passageway 7. The pushing structures 3 are driven by the first cam 92 and a pushing shaft 31 cooperating therewith. The discharging structures 6 are driven by the second cam 93 and a discharging shaft 61 cooperating therewith.

Figure 5:
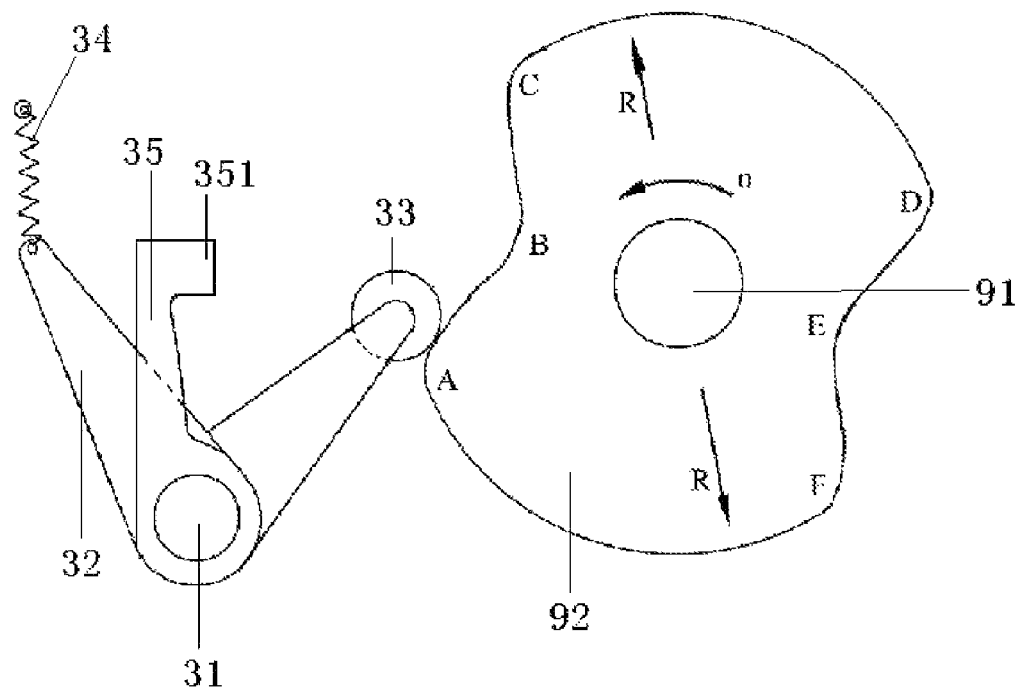
FIG. 5 is a schematic diagram of a capsule pushing system according to one embodiment of the invention.

As shown in FIG. 5, a capsule pushing system of the weighing device comprises the first cam 92 disposed on the main shaft 91 and the pushing structure 3. The first cam 92 drives the pushing structure 3. The pushing structure 3 comprises a first V-shaped lever 32 whose bottom is connected using the pushing shaft 31. One end of the first V-shaped lever 32 close to the first cam 92 is connected to a first idler wheel 33 cooperating with the first cam 92, and the other end of the first V-shaped lever 32 is connected to a movable end of a first spring 34. A pushing deflector rod 35 is fixed on the pushing shaft 31. One end 351 of the pushing deflector rod 35 cooperates with the discharge gate 21 disposed at the lower part of the upper passageway 2. The end 351 of the pushing deflector rod 35 is concave arc-shaped or V-shaped, thereby benefiting the clamping of the capsules. As shown in FIG. 5, the first cam 92 is an irregular plate comprising arcs ABC, CD, DEF, and FA. When the first idler wheel 33 moves against the arc ABC or DEF (the concave part of the cam), due to the swing of the lever 32, the end 351 of the pushing deflector rod 35 extends into the discharge gate 21 to push the capsule into the storage chamber 41 of the transport wheel 4. When the first idler wheel 33 moves against the arc CD or FA (the convex part of the cam), due to the swing of the lever 32, the end 351 of the pushing deflector rod 35 retreat from the discharge gate 21. The "n" in FIG. 5 represents the rotation direction of the first cam 92.

To clamp both sides of the capsules and ensure the stable transportation of the capsules, the contact end of the pushing deflector rod 35 with the capsules is designed V-shaped.

The storage chamber 41 of the transport wheel 4 comprises two parts, i.e., an upper part and a lower part. The storage chamber 41 is smooth inside and the diameter thereof is bigger than the diameter of the cross section of the capsules to be weighed.

The upper part of the storage chamber 41 is wide enough to ensure the capsules to be pushed smoothly and then to slide down to the lower part of the storage chamber 41. The lower part of the storage chamber 41 is relatively narrow and the width thereof is smaller than the diameter of the cross section of the capsules, but is larger than the diameter of a discharging catch pin 65. The invention has no requirement on the shape of the capsules.

Figure 6:
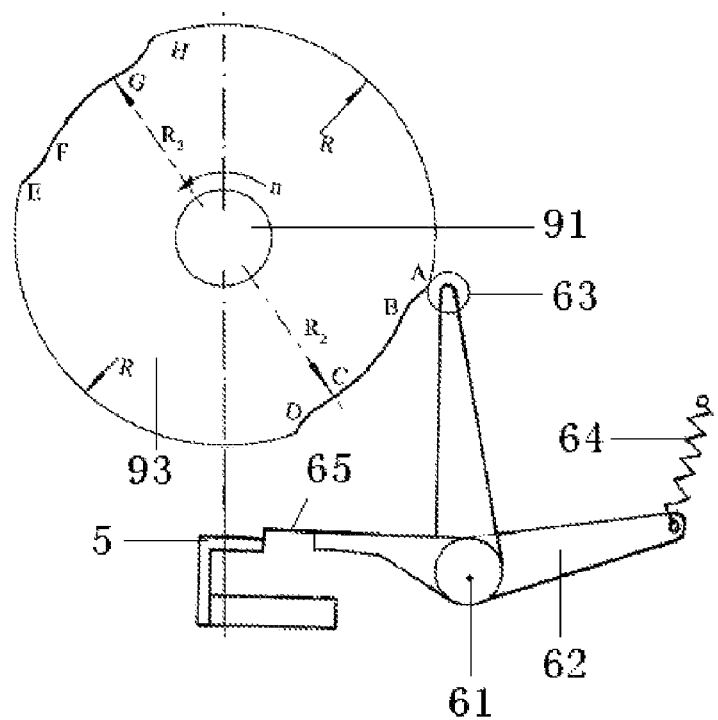
FIG. 6 is a schematic diagram of a capsule discharging system according to one embodiment of the invention.

As shown in FIG. 6, a capsule discharging system of the weighing device comprises the second cam 93 disposed on the main shaft 91 and the discharging structure 6. The second cam 93 drives the discharging structure 6. The discharging structure 6 comprises a second V-shaped lever 62 whose bottom is connected using a discharging shaft 61. One end of the second V-shaped lever 62 close to the second cam 93 is connected to a second idler wheel 63 cooperating with the second cam 93, and the other end of the second V-shaped lever 62 is connected to a movable end of a second spring 64. A discharging catch pin 65 is fixed on the discharging shaft 61. One end of the discharging catch pin 65 is located at a capsule stop position (i.e., where the storage chamber 41 of the transport wheel 4 moves to above the arc-shaped weighing platform 5). The discharging catch pin 65 pushes the capsule from the storage chamber 41 into the weighing platform 5. As shown in FIG. 6, the second cam 93 is an irregular plate comprising arcs ABCD, EFGH (the concave parts of the cam), DE, and HA (the convex parts of the cam). When the second idler wheel 63 moves against the arc ABCD or EFGH, due to the swing of the lever 62, the discharging catch pin 65 pushes the capsules from the storage chamber 41 into the weighing platform 5. When the second idler wheel 63 moves against the arc DE or HA, due to the swing of the lever 62, the discharging catch pin 65 moves a bit upward and retreats from the top of the capsules, thereby ensuring the weighing accuracy of the capsule.

The weighing platform 5 is V-shaped so that the capsule therein can be weighed stably.

Figure 4:
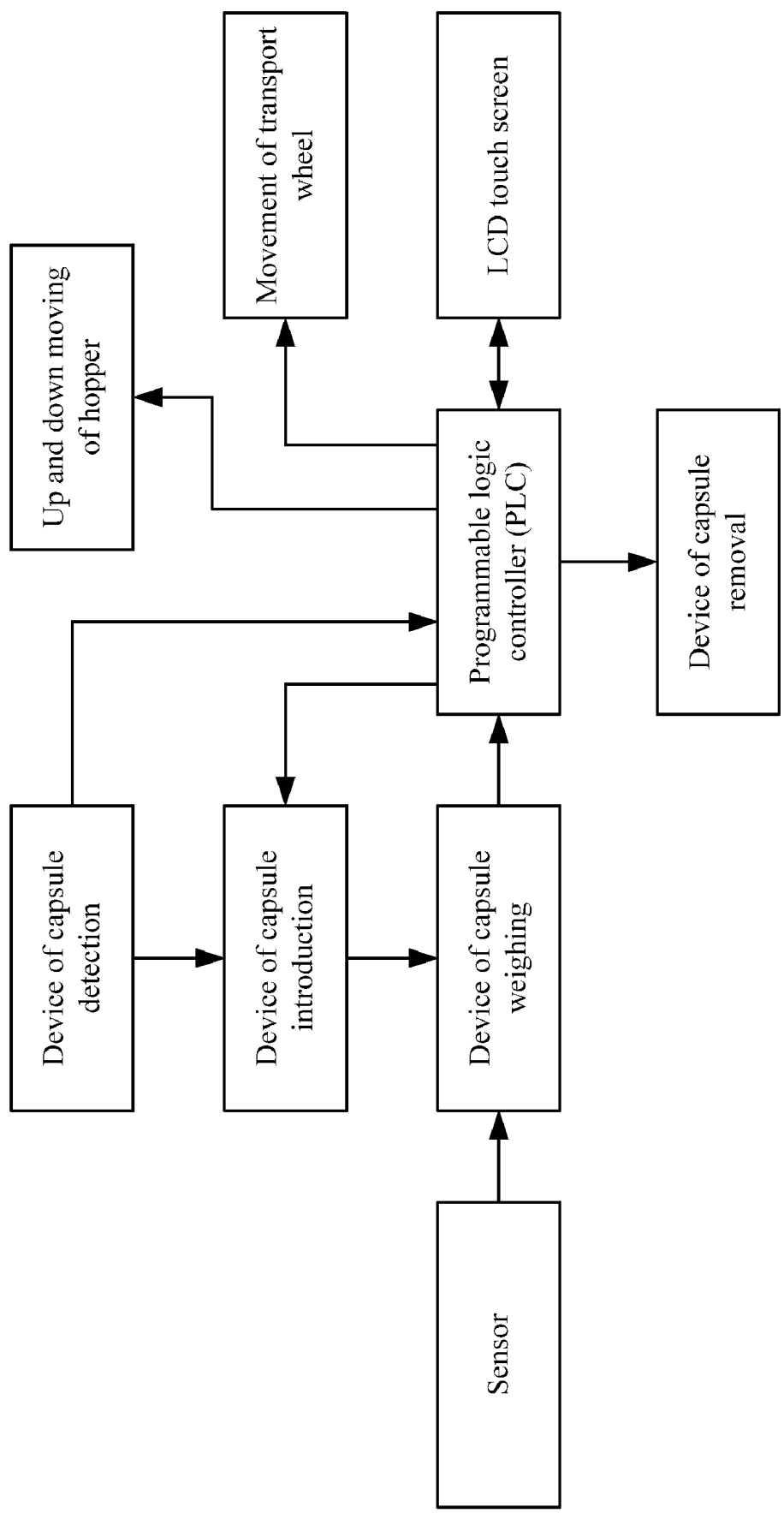
FIG. 4 is a flow chart of a PLC according to one embodiment of the invention.

As shown in FIG. 4, the weighing device is controlled by a PLC (Programmable logic Controller). The PLC receives measured value, standard weight of the capsules and a permissible deviation thereof input by an input device. Furthermore, the PLC controls the move of the hopper 1, the rotation of the transport wheel 4 (i.e., the rotation of the main shaft 91, the first cam 92, and the second cam 93), and removes the disqualified products.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A device for detecting weight of capsules, comprising
a hopper having a top opening and a bottom opening,
a vertical upper passageway having a top opening and a lower end, the top opening of the upper passageway cooperating with the bottom opening of the hopper for receiving capsules,
a discharge gate at the lower end of the upper passageway having two sides,
a main shaft driven by a motor,
a transport wheel disposed on the main shaft and positioned at one side of the discharge gate having at least one storage chamber at its perimeter,
a pushing structure positioned at the other side of the discharge gate and being capable of extending into the discharge gate and pushing the capsules into the storage chamber,
a first cam disposed on the main shaft for driving the pushing structure,
a discharging structure for pushing the capsules out of the storage chamber,
a second cam disposed on the main shaft for driving the discharging structure,
a weighting platform below the transport wheel for accepting and weighing the capsules out of the storage chamber, and
a lower passageway,
wherein the pushing structure has a first idler wheel, the first cam is an irregular plate having concave parts and convex parts, and the concave parts of the first cam coordinate with the first idler wheel for pushing the capsules into the storage chamber; and
the discharging structure has a second idler wheel, the second cam is an irregular plate having concave parts and convex parts, and the concave parts of the second cam coordinate with the second idler wheel for discharging the capsules from the storage chamber.

2. The device of claim 1, further comprising
a plurality of transport wheels, each of the transport wheels is driven by the main shaft synchronously, and each of the transport wheels cooperates with one set of the upper passageway, the pushing structure, the weighing platform, the discharging structure, and the lower passageway;
each of the pushing structures is driven by the first cam and has a pushing shaft cooperating therewith; and
each of the discharging structures is driven by the second cam and has a discharging shaft cooperating therewith.

3. The device of claim 1, wherein the first cam and the pushing structure constitute a capsule pushing system of the weighing device;
the pushing structure comprises a first V-shaped lever whose bottom is connected using a pushing shaft;
one end of the first V-shaped lever close to the first cam is connected to the first idler wheel, and the other end of the first V-shaped lever is connected to a movable end of a first spring;
a pushing deflector rod is fixed on the pushing shaft, and one end of the pushing deflector rod cooperates with the discharge gate.

4. The device of claim 3, wherein the end of the pushing deflector rod cooperating with the discharge gate is concave arc-shaped or V-shaped.

5. The device of claim 1, wherein the second cam and the discharging structure constitute a capsule discharging system of the weighing device;
the discharging structure comprises a second V-shaped lever whose bottom is connected using a discharging shaft;
one end of the second V-shaped lever close to the second cam is connected to the second idler wheel, and the other end of the second V-shaped lever is connected to a movable end of a second spring;
a discharging catch pin is fixed on the discharging shaft, and one end of the discharging catch pin is located at a capsule stop position and pushes the capsule from the storage chamber into the weighing platform.

6. The device of claim 1, further comprising
a photoelectric detector disposed on the upper passageway to detect the number of the capsules therein.

7. The device of claim 6, further comprising
a tilted-upward blowing device is disposed above the photoelectric detector to blow away the capsules clogging the upper passageway.

8. The device of claim 7, further comprising
a programmable logic controller,
wherein prior to weighing, a standard weight of the capsules and a permissible deviation thereof are input into the programmable logic controller, and the programmable logic controller judges whether the capsules are qualified.

9. The device of claim 7, wherein the weighing platform is concave arc-shaped or V-shaped.

10. The device of claim 1, wherein the weighing platform is concave arc-shaped or V-shaped.

11. The device of claim 1, wherein two sides of the top end of the upper passageway are sloping.

12. The device of claim 1, further comprising
a programmable logic controller,
wherein standard weight of the capsules and permissible deviation of the standard weight are input into the programmable logic controller prior to weighing, and the programmable logic controller judges whether the capsules are qualified or disqualified.

13. The device of claim 1, wherein the storage chamber rotates with the transport wheel and cooperates with the discharge gate to accept a capsule through the discharge gate;

the storage chamber rotates to the lowest point of the transport wheel while the capsule is pushed out by the discharging structure and falls into the weighing platform;

the capsule is weighed and evaluated by the weighing platform;

when a next storage chamber rotates to above the weighing platform, the weighed capsule is pushed into the lower passageway;

if qualified in weight, the capsule slides along the lower passageway into a qualified product chamber; otherwise, a valve of the lower passageway is opened so that the capsule slides into a disqualified product chamber.

* * * * *